(12) United States Patent
Chu

(10) Patent No.: US 7,791,854 B2
(45) Date of Patent: Sep. 7, 2010

(54) CURRENT LIMIT PROTECTION APPARATUS AND METHOD FOR CURRENT LIMIT PROTECTION

(75) Inventor: Ping-Ying Chu, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 327 days.

(21) Appl. No.: 11/850,490

(22) Filed: Sep. 5, 2007

(65) Prior Publication Data

US 2009/0059454 A1 Mar. 5, 2009

(51) Int. Cl.
*H02H 9/08* (2006.01)
(52) U.S. Cl. .................................................... 361/93.9
(58) Field of Classification Search ................ 361/93.9
See application file for complete search history.

(56) References Cited

U.S. PATENT DOCUMENTS

| 4,536,699 | A | * | 8/1985 | Baker | 323/276 |
| 6,067,628 | A | * | 5/2000 | Krithivas et al. | 713/340 |
| 6,453,423 | B1 | * | 9/2002 | Loison | 713/310 |
| 6,782,491 | B1 | | 8/2004 | Foedlmeier et al. | 714/37 |

FOREIGN PATENT DOCUMENTS

CN 1322046 11/2001

OTHER PUBLICATIONS

Pan Gao et al., "A dual Port USB Power Switch and Over—Current Protection" China Academic Journal Electronic Publishing House, vol. 22, Nov. 30, 2004, pp. 13-16.

* cited by examiner

*Primary Examiner*—Fritz M. Fleming
*Assistant Examiner*—Lucy Thomas
(74) *Attorney, Agent, or Firm*—J.C. Patents

(57) ABSTRACT

A current limit protection apparatus and a method for current limit protection are provided. The current limit protection apparatus includes a MOS transistor, a current detecting unit, and a current limit circuit. Two source/drain of the MOS transistor are used for receiving a first-voltage and outputting a second-voltage respectively. A gate of the MOS transistor is used for receiving a gate driving signal to determine a conducting current of the MOS transistor. The current detecting unit is used for detecting the conducting current, so as to generate a detecting result. The current limit circuit has a plurality of current threshold values. The current limit circuit selects one of the current threshold values according to an indicating signal and generates the gate driving signal according to a difference between the selected current threshold value and the detecting result.

14 Claims, 4 Drawing Sheets

CURRENT LIMIT PROTECTION APPARATUS AND METHOD FOR CURRENT LIMIT PROTECTION

BACKGROUND OF THE INVENTION

1. Field of the Invention

The present invention relates to a current limit protection apparatus and a method thereof. More particularly, the present invention relates to a current limit protection apparatus having a plurality of current threshold values and a method thereof.

2. Description of Related Art

FIG. 1 is a coupling diagram of a conventional current limit protection apparatus of a computer system. Referring to FIG. 1, the reference numeral 110 represents a conventional current limit protection apparatus; the reference numeral 120 represents a connection port for connecting a universal serial bus (USB) peripheral device; and the reference numeral 130 represents a circuit connected with the current limit protection apparatus 110 in the computer system. The circuit 130 includes a USB controller 131, a resistor 132 and supply voltages VDD1 and VDD2 provided by the computer system. Moreover, GND represents a common level.

The current limit protection apparatus 110 may detect whether its output current is greater than a rated current threshold value, which is generally rated as 500 mA; if not, the current limit protection apparatus 110 normally outputs a voltage VOUT; and if yes, the current limit protection apparatus 110 stops outputting the voltage VOUT, and generates an overload warning signal for the USB controller 131 to notify the computer system that overloading occurs.

The current limit protection apparatus 110 mainly includes a metal-oxide semiconductor (MOS) transistor 111, a current detecting unit 112, a current limit control unit 113 and a driving unit 114. The current detecting unit 112 is used for detecting a conducting current of the MOS transistor 111, so as to generate a detecting result DS. The current limit control unit 113 has a preset aforementioned rated current threshold value, and the current limit control unit 113 judges whether the detecting result DS reaches the rated current threshold value. If yes, the current limit control unit 113 generates a stop driving signal TS and an overload warning signal OC. The driving unit 114 activates in response to an enable signal EN, and outputs a gate driving signal GS to turn on the MOS transistor 111 after being activated. The driving unit 114 stops outputting the gate driving signal GS when the stop driving signal TS is received.

In a conventional technique, though the computer system limits a maximum current outputted to the USB peripheral device via the current limit protection apparatus 110, however the current limit protection apparatus 110 has only one current threshold value, and when the computer system is in a sleeping mode, a power supply of the computer system may only provide a voltage of 5V and a current of 2~2.5 A. Therefore, in this case, if the USB peripheral devices which connected with the computer system do not go into the sleeping mode sequentially, and still consume a great amount of power, the power supply will be overloaded, and the output voltage of the power supply will be decreased. Accordingly, the necessary peripheral devices of the computer system cannot work normally due to lack of basic power, and the computer system then cannot recover to a normal mode from the sleeping mode.

In a normal condition, if all of the USB peripheral devices may work in accordance with regulations, overloading of the power supply during the sleeping mode can be avoided. However, some USB peripheral devices in the market still do not comply with an USB specification in which only 2.5 mA is allowed to be consumed during the sleeping mode, which causing the computer system unable to recover to the normal mode from the sleeping mode.

SUMMARY OF THE INVENTION

The present invention is directed to a current limit protection apparatus and a method thereof, by which overloading of a power supply under a sleeping mode can be avoided, and a computer system may smoothly recover to a normal mode from the sleeping mode.

According to an aspect of the present invention, a current limit protection apparatus and a method thereof are provided, by which current threshold values can be adjusted according to the type of a predetermined energy-saving mode of the computer system.

According to another aspect of the present invention, a current limit protection apparatus is provided, by which a plurality of current threshold values are predetermined, and one of the predetermined current threshold values can be selected according to an indicating signal.

The present invention provides a current limit protection apparatus including a MOS transistor, a current detecting unit and a current limit circuit. A source/drain of the MOS transistor is used for receiving a first-voltage; and another source/drain of the MOS transistor is used for outputting a second-voltage. A gate of the MOS transistor is used for receiving a gate driving signal to determine a conducting current of the MOS transistor. The current detecting unit is used for detecting the conducting current of the MOS transistor, so as to generate a detecting result. The current limit circuit has a plurality of current threshold values. The current limit circuit selects one of the current threshold values according to an indicating signal and generates the gate driving signal according to the difference between the selected current threshold value and the detecting result.

The present invention also provides a method for current limit protection, by which currents supplied to an USB peripheral device by the computer system are limited, wherein the computer system has predetermined energy-saving modes. The steps of the current limit protection are as follows. First, a plurality of current threshold values is defined. Next, one of the current threshold values is selected according to an indicating signal, wherein the indicating signal is used for indicating whether the computer system is in one of the predetermined energy-saving modes. Next, the current supplied to the USB peripheral device is detected. Next, the current supplied to the USB peripheral device is judged whether or not it reaches the selected current threshold value; if yes, the current supplied to the USB peripheral device is fixed to the selected current threshold value; if not, the current is supplied normally to the USB peripheral device.

In the present invention, a plurality of current threshold values is defined, and the supplied currents of different values can be selected according to the indicating signal. If the present invention is applied to the USB connection port, the current supplied to the USB peripheral device can be limited according to an operation mode of the computer system, and overloading of the power supply during the sleeping mode may be avoided, such that the computer system may smoothly recover to the normal mode from the sleeping mode.

In order to make the aforementioned and other objects, features and advantages of the present invention comprehensible, a preferred embodiment accompanied with figures is described in detail below.

DESCRIPTION OF EMBODIMENTS

Figure 1:
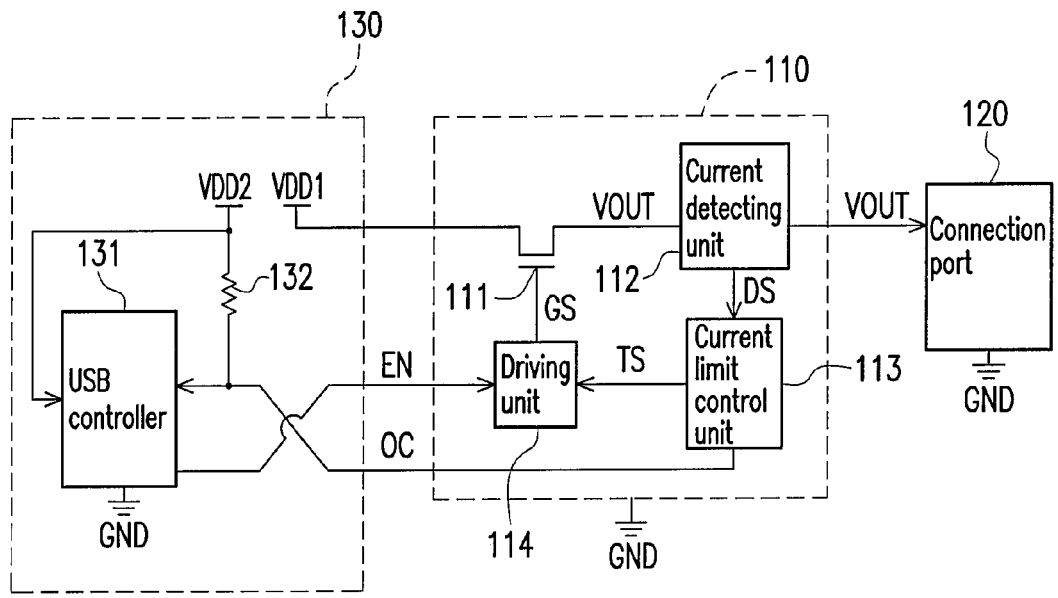
FIG. 1 is a coupling diagram of a conventional current limit protection apparatus of a computer system.
Figure 2:
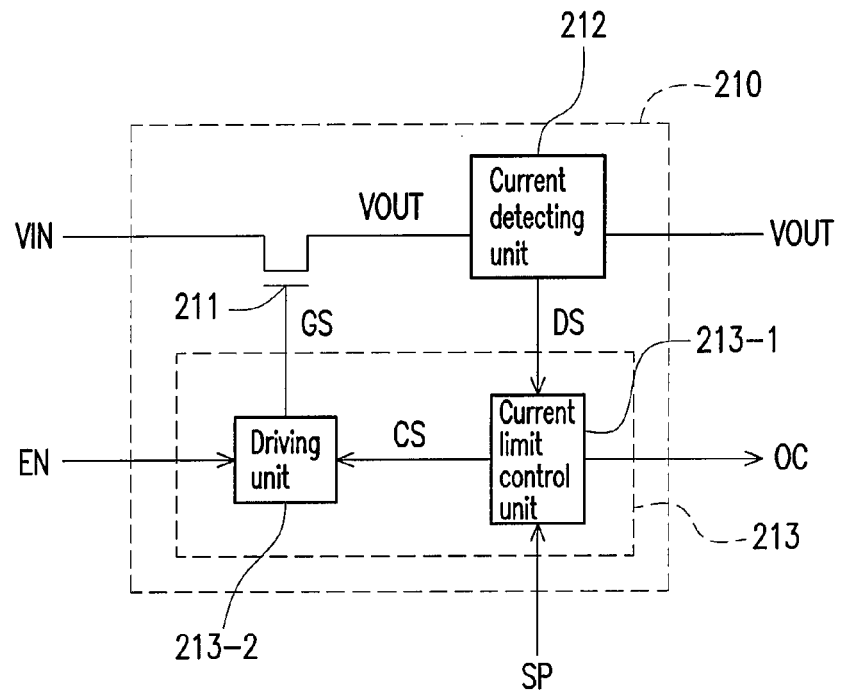
FIG. 2 is a block diagram illustrating a main circuit of a current limit protection apparatus according to an embodiment of the present invention.

FIG. 2 is a block diagram illustrating a main circuit of a current limit protection apparatus according to an embodiment of the present invention. Referring to FIG. 2, the current limit protection apparatus 210 mainly includes a MOS transistor 211, a current detecting unit 212 and a current limit circuit 213. One of a source/drain of the MOS transistor 211 is used for receiving a voltage VIN; and another one of the source/drain of the MOS transistor 211 is used for outputting a voltage VOUT. A gate of the MOS transistor 211 is used for receiving a gate driving signal GS to determine a conducting current of the MOS transistor 211. The current detecting unit 212 is used for detecting the conducting current of the MOS transistor 211, so as to generate a detecting result DS. The current limit circuit 213 includes a current limit control unit 213-1 and a driving unit 213-2. The current limit control unit 213-1 has a plurality of current threshold values. The current limit control unit 213-1 selects one of the current threshold values according to an indicating signal SP and generates a control signal CS according to the difference between the selected current threshold value and the detecting result DS. The driving unit 213-2 activates in response to an enable signal EN, and generates the gate driving signal GS according to the control signal CS. Since the current detecting unit 212 is used for detecting the conducting current of the MOS transistor 211, coupling method of the current detecting unit 212 of FIG. 2 is just used as an example, which can be varied according to an actual requirement.

Moreover, when the current limit control unit 213-1 judges that the detecting result DS reaches the selected current threshold value, the current limit control unit 213-1 may further output an overload warning signal OC. Certainly, this function is optional according to the actual requirement.

Since the aforementioned current limit protection apparatus 210 may have the plurality of current threshold values, and one of the current threshold values may be selected according to the indicating signal SP, the current limit protection apparatus 210 may limit a supplied current according to different situations indicated by the indicating signal SP, and is suitable to be applied to occasions where the supplied current needs to be limited according to different situations. Application of the current limit protection apparatus 210 on an USB connection port of the computer system is taken as an example, and coupling method of the current limit protection apparatus 210 is shown in FIG. 3.

Figure 3:
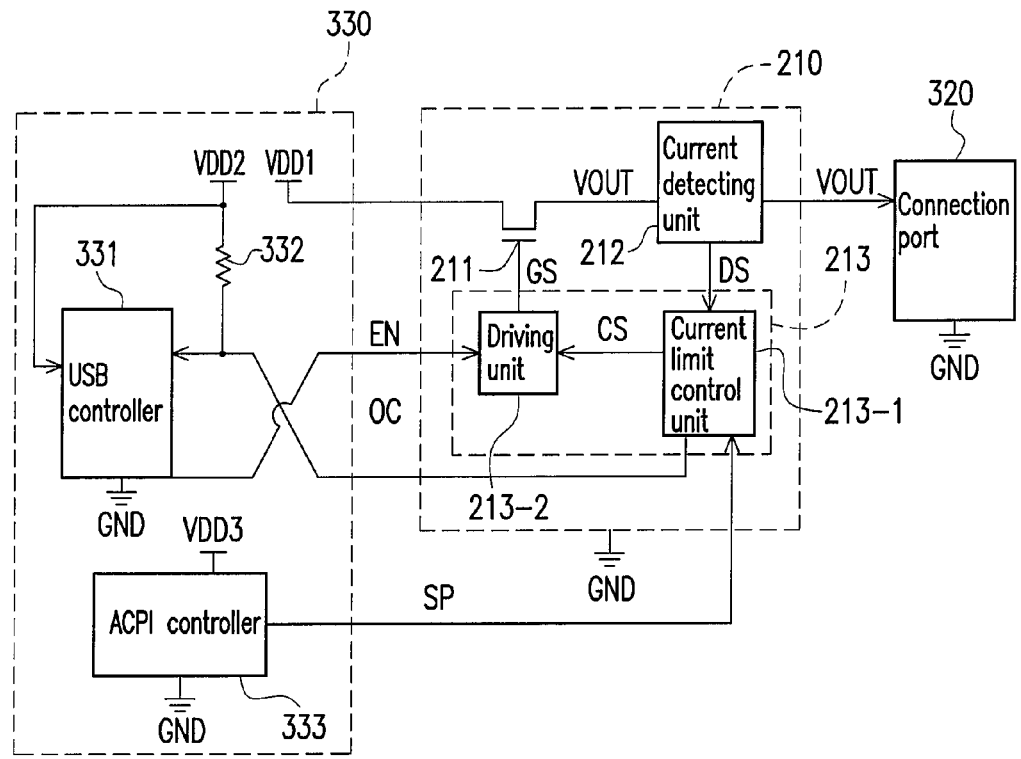
FIG. 3 is a coupling diagram of a current limit protection apparatus applied to an USB peripheral device of a computer system according to an embodiment of the present invention.

FIG. 3 is a coupling diagram of a current limit protection apparatus applied to peripheral devices of an USB of a computer system according to an embodiment of the present invention. Referring to FIG. 3, reference numeral 210 represents the current limit protection apparatus of FIG. 2; reference numeral 320 represents the connection port for connecting the peripheral devices of the USB; and reference numeral 330 represents the circuit connected with the current limit protection apparatus 210 in the computer system. The circuit 330 includes an USB controller 331, a resistor 332, an advanced configuration and power interface (ACPI) controller 333, and supply voltages VDD1, VDD2 and VDD3 provided by the computer system. Moreover, GND represents a common level.

Assuming the current limit control unit 213-1 has two predetermined current threshold values 500 mA and 2.5 mA, and assuming that current assumption of the USB peripheral device (not shown) connected with the computer system via the connection port 320 is no more than 500 mA during a normal mode, and current assumption of the USB peripheral device is no more than 2.5 mA during a sleeping mode. The operation of the current limit protection apparatus 210 may be shown with reference to FIG. 4.

Figure 4:
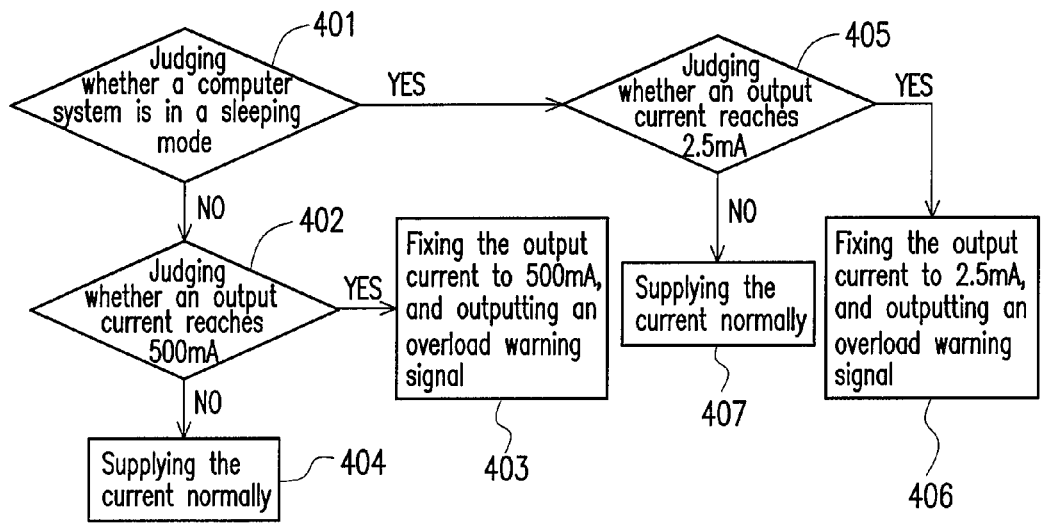
FIG. 4 is an operation flowchart of the current limit protection apparatus 210 of FIG. 3.

FIG. 4 is an operation flowchart of the current limit protection apparatus 210 of FIG. 3. Referring to FIG. 3 and FIG. 4, the current limit control unit 213-1 judges whether the computer system is in the sleeping mode or not according to the indicating signal SP (step 401). If the computer system is not in the sleeping mode, the current limit control unit 213-1 then selects 500 mA as the current limit threshold value, and judges whether the detecting result DS (i.e. output current) reaches 500 mA (step 402). If the detection result DS reaches 500 mA, and the difference between the selected current threshold value and the detecting result DS is zero, the current limit control unit 213-1 then generates the control signal CS according to the above difference, such that the driving unit 213-2 may generate the gate driving signal GS according to the control signal CS to control a conducting extent of the MOS transistor 211, wherein the conducting current of the MOS transistor 211 can be fixed to 500 mA. The current limit control unit 213-1 may further output a corresponding overload warning signal OC (step 403). If the current limit control unit 213-1 judges that the detecting result DS does not reach 500 mA, the MOS transistor 211 is controlled to maintain an original conducting extent, so as to maintain an original conducting current, and therefore the current can be supplied normally (step 404).

Conversely, if the computer system is in the sleeping mode, the current limit control unit 213-1 then selects 2.5 mA as the current limit threshold value, and judges whether or not the detecting result DS reaches 2.5 mA (step 405). If the detecting result DS reaches 2.5 mA, and the difference between the selected current threshold value and the detecting result DS is zero, the current limit control unit 213-1 then generates the control signal CS according to the above difference, such that the driving unit 213-2 may generate the gate driving signal GS according to the control signal CS to control the conducting extent of the MOS transistor 211, wherein the conducting current of the MOS transistor 211 can be fixed to 2.5 mA. The current limit control unit 213-1 may further output the corresponding overload warning signal OC (step 406). If the current limit control unit 213-1 judges that the detecting result DS does not reach 2.5 mA, the MOS transistor 211 is controlled to maintain an original conducting extent, so as to maintain an original conducting current, and therefore the current can be supplied normally (step 407).

Figure 5:
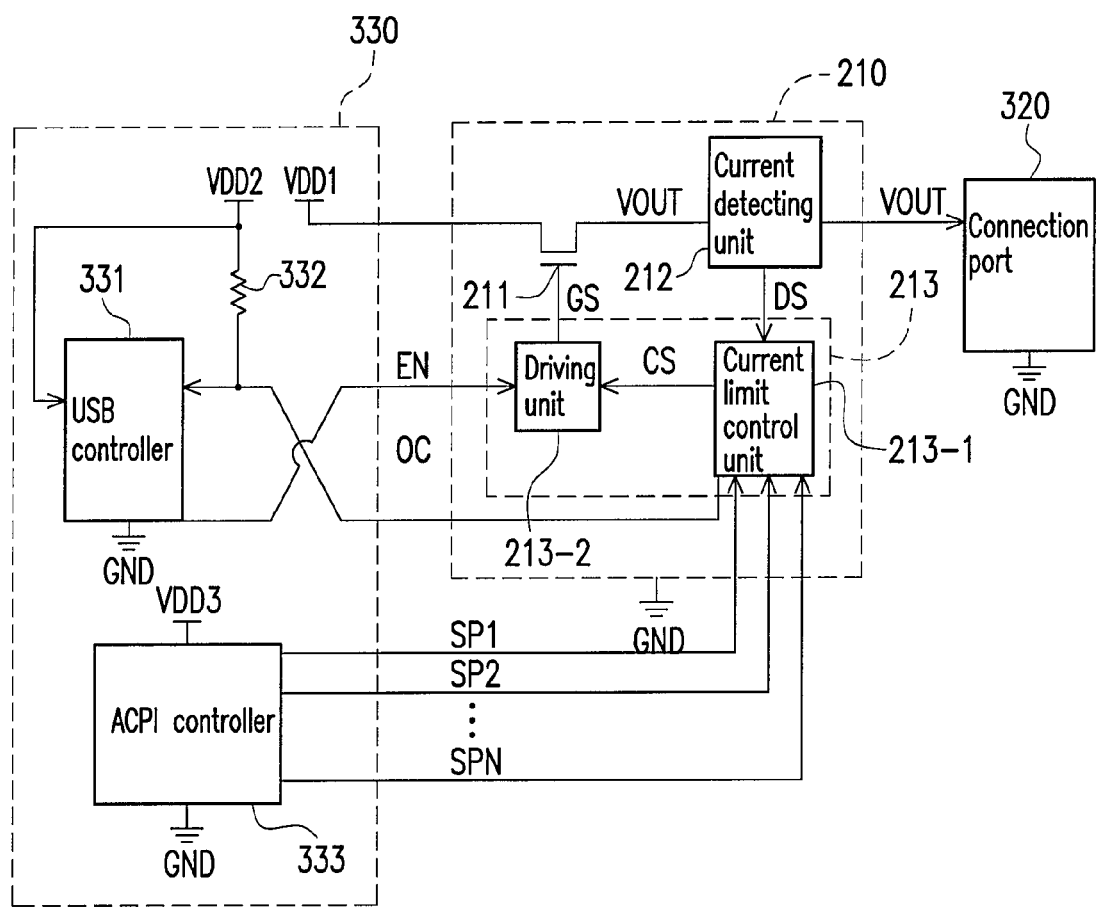
FIG. 5 is a coupling diagram of a current limit protection apparatus applied to an USB peripheral device of a computer system according to another embodiment of the present invention.

FIG. 5 is a coupling diagram of a current limit protection apparatus applied to an USB peripheral device of a computer system according to another embodiment of the present invention. Referring to FIG. 3 and FIG. 5, the circuit structure of the current limit protection apparatus 510 of FIG. 5 is similar to that of the current limit protection apparatus 210 of FIG. 3 except for the current limit control unit 513-1 may select one of the predetermined current threshold values according to the indicating signals SP1~SPN outputted by the ACPI controller 333, simultaneously.

In the example of FIG. 5, though all the indicating signals come from the ACPI controller 333, those having ordinary knowledge in the art would acknowledge that other electrical signals in the computer system may also be appointed to be the indicating signals, as long as energy-saving modes of the computer system can be identified. Moreover, the indicating signals are not limited to be analog signals or digital signals, and only a design of the current limit control unit is required to be varied according to a form of the indicating signals.

Figure 6:
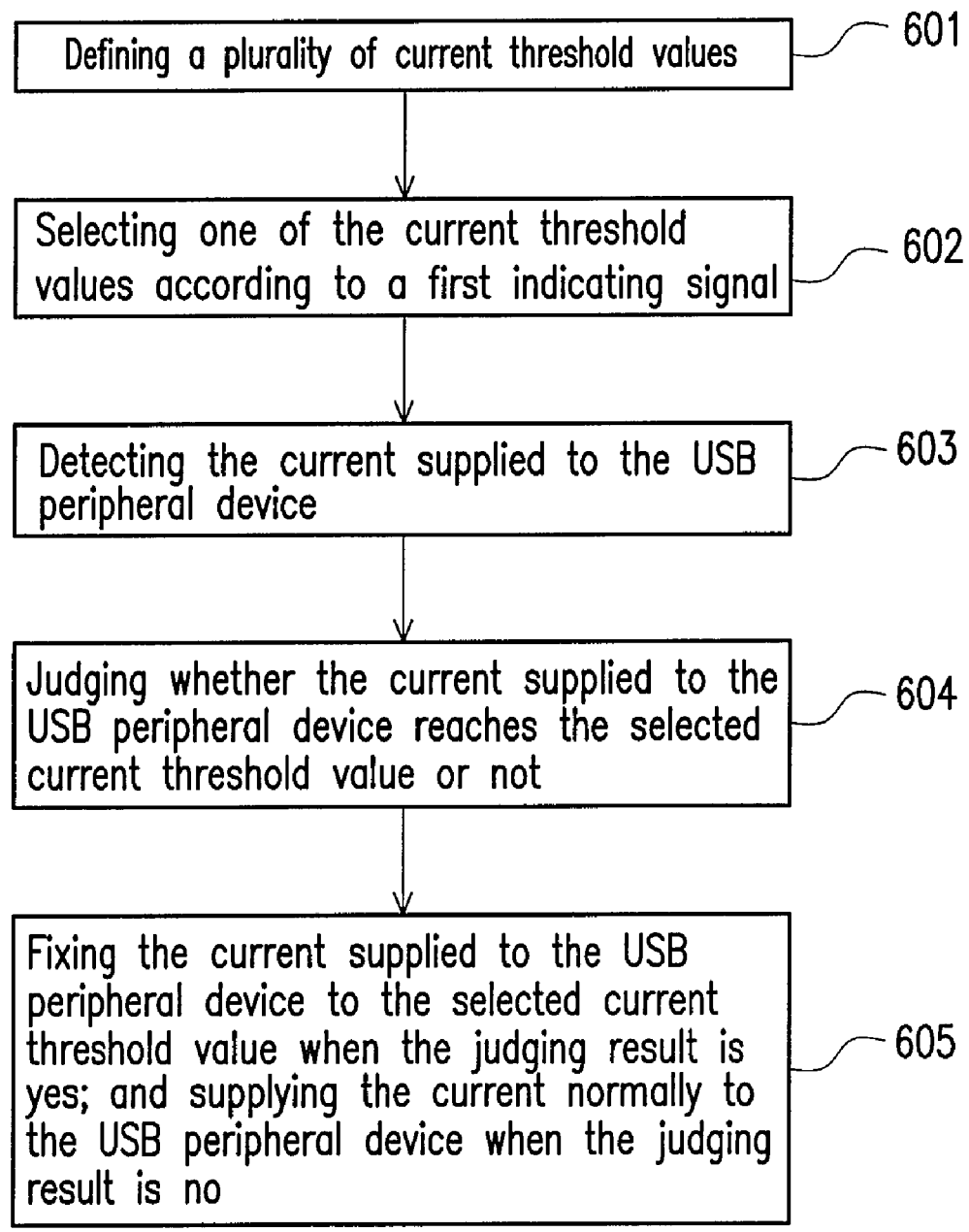
FIG. 6 is a flowchart illustrating a method for current limit protection according to an embodiment of the present invention.

A method for current limit protection as shown in FIG. 6 is provided based on the aforementioned embodiments, by which application of the current limit protection apparatus is applied to the USB connection port of the computer system. FIG. 6 is a flowchart illustrating a method for current limit protection according to an embodiment of the present invention. The method includes the following steps. First, a plurality of current threshold values is defined (step 601). Then, one of the current threshold values is selected according to an indicating signal, wherein the indicating signal is used for indicating whether the computer system is in one of the predetermined energy-saving modes (step 602). Next, the current supplied to the USB peripheral device is detected (step 603). Then, the current supplied to the USB peripheral device is judged whether it reaches the selected current threshold value or not (step 604); if yes, the current supplied to the USB peripheral device is fixed to the selected current threshold value; if not, the current is supplied normally to the USB peripheral device (step 605).

In the aforementioned embodiments, the current limit protection apparatus are all applied to the USB peripheral device of the computer system. However, this is just for the convenience of demonstration and has no intention to limit the application of the current limit protection apparatus of the present invention.

In summary, a plurality of current threshold values is defined in the present invention, and currents of different values can be selected according to the corresponding indicating signal. If the current limit protection apparatus based on the present invention is applied to the USB connection port, the current supplied to the USB peripheral device can be limited according to an operation mode of the computer system, and overloading of the power supply during the sleeping mode can be avoided, such that the computer system may smoothly recover to the normal mode from the sleeping mode.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A current limit protection apparatus, comprising:
a metal-oxide-semiconductor (MOS) transistor, comprising a first source/drain for receiving a first voltage, a second source/drain of the MOS transistor for outputting a second voltage, and a gate for receiving a gate driving signal to determine a conducting current of the MOS transistor;
a current detecting unit, for detecting the conducting current of the MOS transistor, so as to generate a detecting result; and
a current limit circuit, having a plurality of current threshold values, for selecting one of the current threshold values according to a first indicating signal and generating the gate driving signal according to a difference between the selected current threshold value and the detecting result, wherein the first indicating signal is output from an advanced configuration and power interface (ACPI) controller disposed in a computer system, the computer system has a plurality of predetermined energy-saving modes, and the first indicating signal is used for indicating whether the computer system is in one of the predetermined energy-saving modes or not; when the first indicating signal indicates the computer system is in one of the predetermined energy-saving modes, the current limit circuit limits the conducting current of the MOS transistor to the selected current threshold value to prevent a power supply of the computer system from overloading such that the computer system can smoothly recover to a normal mode from the one of the predetermined energy-saving modes.

2. The current limit protection apparatus as claimed in claim 1, wherein the current limit circuit includes:
a current limit control unit, having the plurality of current threshold values, for selecting one of the current threshold values according to the first indicating signal and generating a control signal according to a difference between the selected current threshold value and the detecting result; and
a driving unit, for generating the gate driving signal according to the control signal.

3. The current limit protection apparatus as claimed in claim 2, wherein the second voltage is supplied to an universal serial bus (USB) peripheral device, the current limit control unit is further coupled to an USB controller, and the current limit control unit further outputs an overload warning signal to the USB controller when the detecting result reaches the selected current threshold value.

4. The current limit protection apparatus as claimed in claim 2, wherein the current limit control unit further receives a second indicating signal, and selects one of the current threshold values according to the first indicating signal and the second indicating signal.

5. The current limit protection apparatus as claimed in claim 4, wherein the second indicating signal is output from the ACPI controller.

6. The current limit protection apparatus as claimed in claim 4, wherein the first indicating signal and the second indicating signal comprise analog signals or digital signals.

7. The current limit protection apparatus as claimed in claim 1, wherein the first indicating signal comprises an analog signal or a digital signal.

8. The current limit protection apparatus as claimed in claim 1, wherein the current detecting unit is directly connected to the second voltage and is not directly connected to the first voltage.

9. A method for current limit protection, suitable for limiting a current supplied to an USB peripheral device by a computer system, wherein the computer system has a plurality of predetermined energy-saving modes, the method comprising:
defining a plurality of current threshold values;

selecting one of the current threshold values according to a first indicating signal, wherein the first indicating signal is used for indicating whether or not the computer system is in one of the predetermined energy-saving modes, wherein the first indicating signal is output from an ACPI controller disposed in the computer system;

detecting a current supplied to the USB peripheral device;

judging whether or not the current supplied to the USB peripheral device reaches the selected current threshold value; and fixing the current supplied to the USB peripheral device to the selected current threshold value when the judging result indicates that the current supplied to the USB peripheral device reaches the selected current threshold value to prevent a power supply of the computer system from overloading such that the computer system can smoothly recover to a normal mode from the one of the predetermined energy-saving modes; and supplying the current normally to the USB peripheral device when the judging result indicates that the current supplied to the USB peripheral device has not reached the selected current threshold value.

10. The method for current limit protection as claimed in claim 9, wherein the step of selecting one of the current threshold values according to the first indicating signal further comprises selecting one of the current threshold values according to a second indicating signal, simultaneously.

11. The method for current limit protection as claimed in claim 10, wherein the second indicating signal is output from the ACPI controller.

12. The method for current limit protection as claimed in claim 10, wherein the first indicating signal and the second indicating signal comprise analog signals or digital signals.

13. The method for current limit protection as claimed in claim 9, wherein the first indicating signal comprises an analog signal or a digital signal.

14. The method for current limit protection as claimed in claim 9, wherein an overload warning signal is further generated and provided to an USB controller when the current supplied to the USB peripheral device reaches the selected current threshold value.

* * * * *